(12) United States Patent
Makovicka et al.

(10) Patent No.: US 7,561,654 B2
(45) Date of Patent: Jul. 14, 2009

(54) NUCLEAR FUEL SPACER ASSEMBLY WITH DEBRIS GUIDE

(75) Inventors: Mason Dennis Makovicka, Wilmington, NC (US); Michael Thomas Kiernan, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 0 days.

(21) Appl. No.: 11/453,776

(22) Filed: Jun. 16, 2006

(65) Prior Publication Data

US 2007/0291893 A1 Dec. 20, 2007

(51) Int. Cl.
*G21C 3/34* (2006.01)

(52) U.S. Cl. ............ 376/441; 376/440; 376/313; 376/439; 376/442

(58) Field of Classification Search ............ 376/441, 376/448, 439, 434, 442, 444, 313, 440
See application file for complete search history.

(56) References Cited

U.S. PATENT DOCUMENTS

| | | | | |
|---|---|---|---|---|
| 3,510,397 A | * | 5/1970 | Zettervall | 376/441 |
| 3,762,996 A | * | 10/1973 | Milburn et al. | 376/442 |
| 3,886,038 A | * | 5/1975 | Raven | 376/439 |
| 4,692,303 A | * | 9/1987 | Osborne | 376/446 |
| 4,705,663 A | * | 11/1987 | Steven et al. | 376/442 |
| 4,775,510 A | * | 10/1988 | Bryan | 376/443 |
| 4,999,153 A | * | 3/1991 | Johansson et al. | 376/443 |
| 5,078,961 A | * | 1/1992 | Johansson et al. | 376/448 |
| 5,085,827 A | * | 2/1992 | Johansson et al. | 376/444 |
| 5,089,221 A | * | 2/1992 | Johansson et al. | 376/442 |
| 5,186,891 A | * | 2/1993 | Johansson et al. | 376/438 |
| 5,311,564 A | * | 5/1994 | Steinke | 376/441 |
| 5,313,506 A | * | 5/1994 | Matzner et al. | 376/441 |
| 5,327,470 A | * | 7/1994 | Johansson | 376/438 |
| 5,331,679 A | * | 7/1994 | Hirukawa | 376/439 |
| 5,481,577 A | * | 1/1996 | Yates et al. | 376/313 |
| 5,488,644 A | * | 1/1996 | Johansson | 376/441 |
| 5,566,217 A | * | 10/1996 | Croteau et al. | 376/442 |
| 5,675,621 A | * | 10/1997 | Croteau et al. | 376/441 |
| 5,875,223 A | * | 2/1999 | Nylund | 376/439 |
| 6,278,759 B1 | * | 8/2001 | Yoon et al. | 376/462 |

* cited by examiner

*Primary Examiner*—Rick Palabrica
(74) *Attorney, Agent, or Firm*—Harness, Dickey & Pierce

(57) ABSTRACT

In a fuel assembly for a nuclear reactor, a plurality of nuclear fuel rods and at least one fuel rod spacer assembly supporting the fuel rods in an organized array. The fuel rod spacer assembly includes a guide at a leading edge of the fuel rod spacer assembly. The guide is angled towards the fuel rod for directing debris to open passages in the fuel rod spacer assembly.

3 Claims, 3 Drawing Sheets

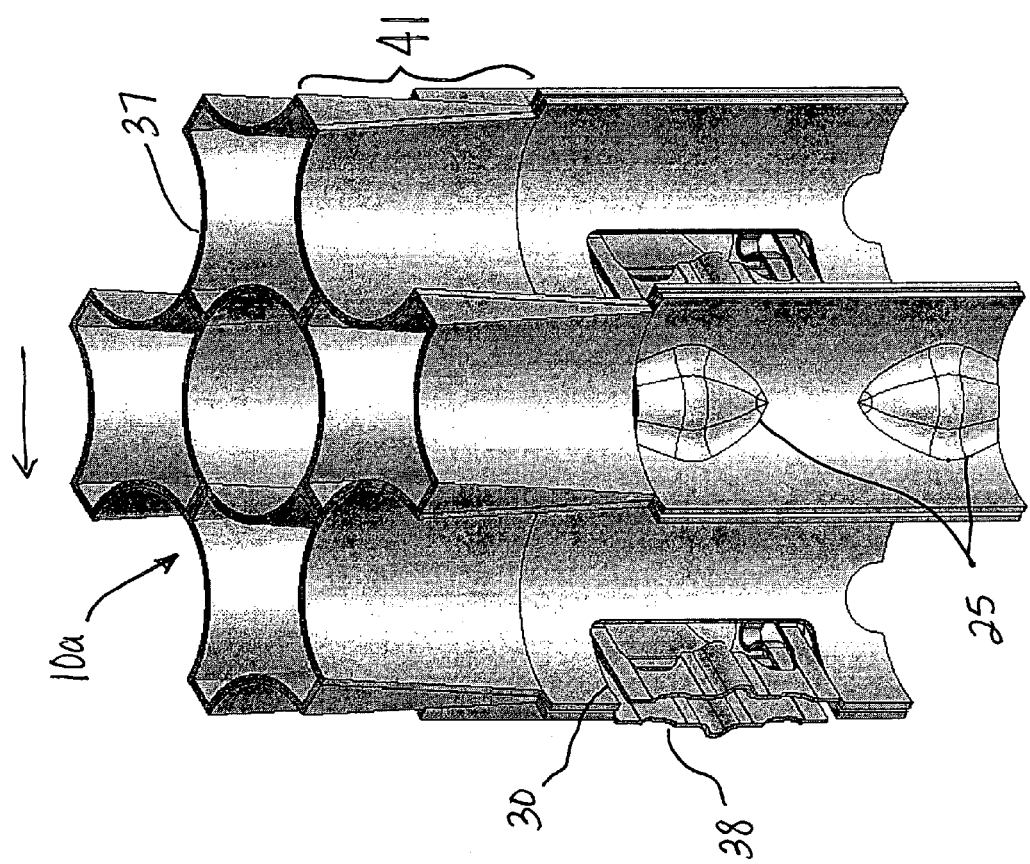

NUCLEAR FUEL SPACER ASSEMBLY WITH DEBRIS GUIDE

BACKGROUND OF THE INVENTION

1. Field of the Invention

This invention relates generally to a nuclear fuel rod spacer assembly.

2. Description of Related Art

During manufacture and subsequent installation and repair of components comprising a nuclear reactor coolant circulation system, diligent effort is made to assure removal of all debris (e.g., metal chips and shavings, small solid sections of metal, and the like) from the reactor vessel and its associated systems which circulate coolant therethrough under various operating conditions. Although elaborate procedures are carried out to help assure debris removal, and in spite of the safeguards used to effect such removal, some chips and metal particles still remain hidden in the system.

For example, damage to the fuel assembly may occur due to debris trapped at the fuel rod spacer assembly in reactors. The damage consists of fuel rod tube perforations caused by fretting of debris in contact with the exterior of the tube. The debris tends to be relatively thin rectangular pieces, as opposed to pieces which are spherical in shape. Specifically, most of the debris consists of metal turnings which were probably left in the primary system after steam generator repair or replacement. The debris may lodge in the region of within the spaces between its "egg-crate" shaped cell walls (or ferrule cells) and/or the leading edge of the fuel rod spacer assembly.

One approach to solve the above problem has been to install filtering devices into a lower tieplate of the bundle for catching the debris and remove the filters during preoperational testing. Although these filtering devices have been effective in filtering out a wide range of debris types and sizes, these conventional filters do not filter all the debris and do not protect debris from entering the fuel bundle, for example, from the top of the bundle While the conventional approach may operate reasonably well and may generally achieve their objectives under the range of operating conditions for which they were designed, they also create several other problems (e.g., compatibility issue, inconsistent operating cycle, cost, and others.). Consequently, a need exists for a fresh approach to the problem of debris capture in nuclear reactors. The new approach must be compatible with the existing structure and operation of the components of the reactor, be effective throughout the operating cycle of the reactor, and at least provides overall benefits which outweigh the costs it adds to the reactor.

BRIEF DESCRIPTION OF THE INVENTION

In an exemplary embodiment of the present invention, a fuel assembly for a nuclear reactor is disclosed. The fuel assembly may include a plurality of nuclear fuel rods, and at least one fuel rod spacer assembly supporting the fuel rods in an organized array. The fuel rod spacer assembly contains a guide for directing debris to open passages in a fuel rod spacer assembly.

In another exemplary embodiment, the guide is angled toward the fuel rod.

In another exemplary embodiment, the guide is located interior to the fuel rod spacer assembly so that horizontal surfaces are shielded from the coolant flow with angled members (e.g., divert debris away for such surfaces that are prone to collect debris).

In another exemplary embodiment, the guide is integral to the fuel rod spacer assembly and acts to close off the inter-sub-channel paths that tend to collect debris.

In another exemplary embodiment, the guide is located at a leading edge of the fuel rod spacer assembly to affect the coolant flow.

In another exemplary embodiment, the guide is designed to preferentially orient the debris to present the minimum cross sectional area to increase the probability that the debris can completely pass through the fuel rod spacer assembly.

In another example embodiment, the present invention discloses a nuclear fuel rod spacer assembly that incorporates specific features or devices to direct debris in the reactor coolant through open spaces in the fuel rod spacer assembly to reduce the probability of debris being captured by the fuel rod spacer assembly and subsequently causing a fuel rod failure due to fretting.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein:

FIG. 4 is an isometric sectional view of a fuel rod spacer assembly depicting one sub-channel in accordance with an exemplary embodiment of the invention.

DETAILED DESCRIPTION OF EXAMPLE EMBODIMENTS OF THE INVENTION

It should be noted that these Figures are intended to illustrate the general characteristics of method and apparatus of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention. The relative dimensions and size of a fuel assembly may be reduced or exaggerated for clarity. Like numerals are used for liked and corresponding parts of the various drawings.

In general, a fuel assembly as described herein may be the type used in a boiling pressurized water reactor. The fuel assembly will typically include fuel rods held in spaced relationship with one another by grids spaced along the fuel assembly length. Each fuel rod includes nuclear fuel pellets (not shown) and is closed at its opposite ends by upper and lower end plugs. The fuel pellets composed of fissile material are responsible for creating the reactive power of the reactor. A liquid moderator/coolant such as water, or water containing boron, is pumped upwardly through a plurality of flow openings in the lower core plate to the fuel assemblies. A bottom nozzle of each assembly has a series of flow holes defined through which the coolant flows upwardly through the fuel channel and along the fuel rods of the fuel assembly in order to extract heat generated therein for the production of useful work.

Figure 1:
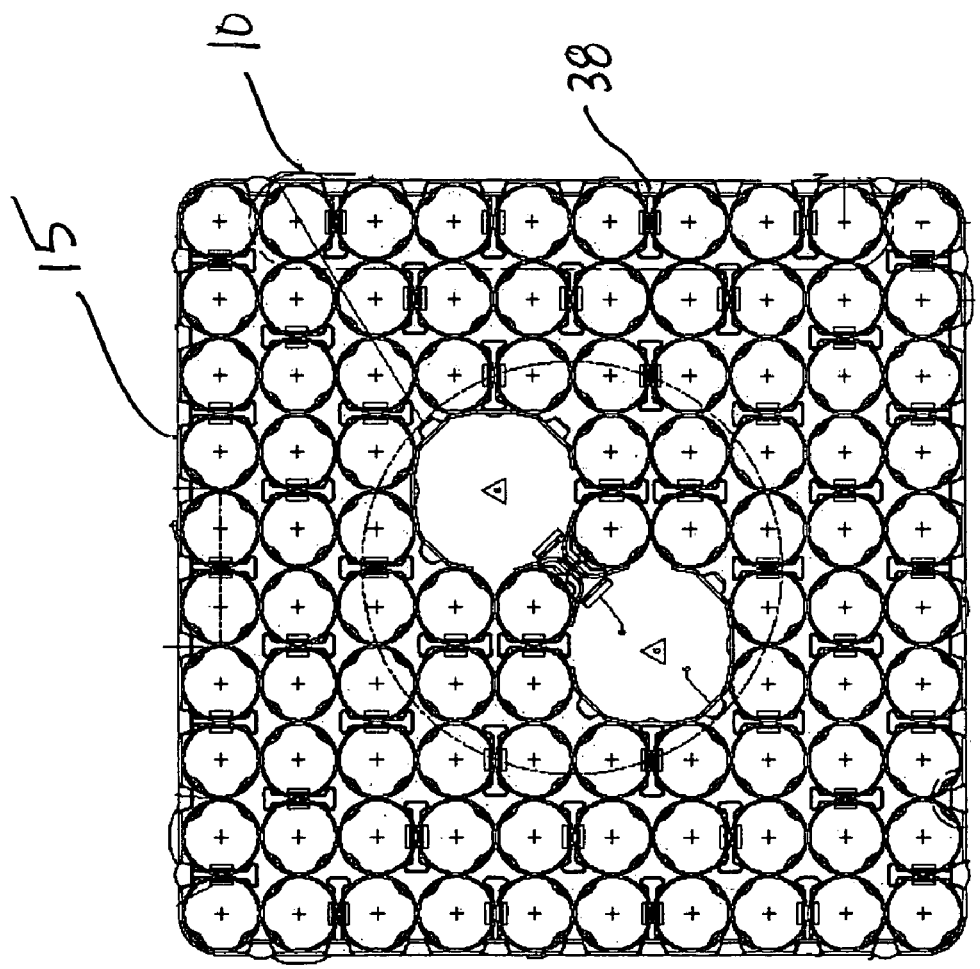
FIG. 1 is a perspective view of a fuel rod spacer assembly in a fuel assembly grid in accordance with an exemplary embodiment of the invention.

FIG. 1 illustrates a fuel rod spacer assembly 10 in accordance with an exemplary embodiment of the present invention. The fuel rod spacer assembly 10 is organized in a rod supporting cell 15 which supports fuel rods 20 (shown in FIG. 3) as an array. For example, a 10×10 array is shown in FIG. 1 to support the fuel rods. The fuel rods may be, for example, about 160 inches long and about 0.4 to 0.5 inches in diameter.

The fuel rod spacer assembly 10 may have two purposes. First, the fuel rod spacer assembly 10 may provide mechanical support to maintain the uniform spacing of the fuel rods 20 for the lifetime of the fuel bundle assembly. Second, the fuel rod spacer assembly 10 may provide mixing of the liquid water coolant/moderator enabling the fuel rod 20 to operate at higher power before thermal failure. It should be appreciated by one skilled in the art that there may be a plurality of cells 15 for supporting the fuel rods 20.

Figure 2:
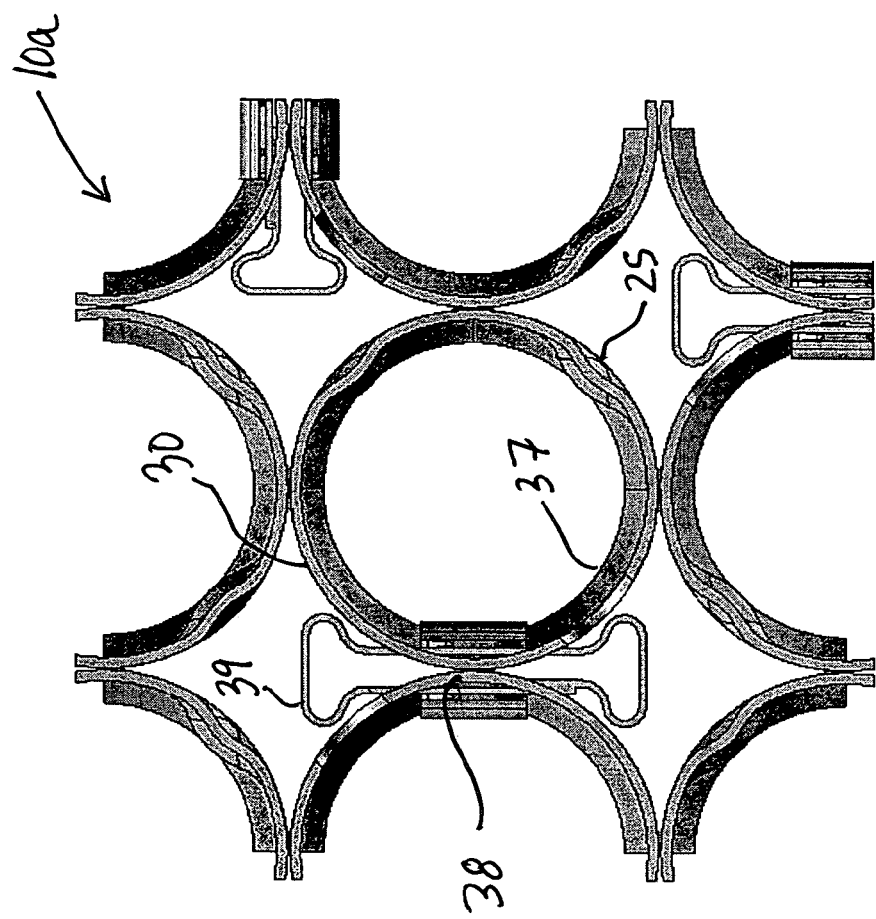
FIG. 2 is a sectional view of a fuel rod spacer assembly depicting one sub-channel in accordance with an exemplary embodiment of the invention.

The fuel assembly (not shown) includes at least one fuel rod spacer assembly 10 positioned around the fuel rods 20. The fuel rod spacer assembly 10 may be positioned at varying elevations along the length of the fuel bundle. It should also be appreciated that there may be more than one fuel rod spacer assembly 10 in the fuel assembly. The fuel rod spacer assembly 10 may also protect the rods 20 from contact abrading. Moreover, the fuel rod spacer assembly 10 may provide appropriate restraints for each fuel rod 20 at their respective elevations and thus prevent abrading contact between the fuel rods 20 and maintain the fuel rods 20 at uniform spacing relative to one another along the length of the fuel bundle for optimum performance. Referring to FIGS. 2 and 4, the fuel rod spacer assembly 10 depicting one sub-channel 10a is shown. Within each sub-channel 10a is an opening 30 for a spring 38 to be inserted. The spring 38 may help alleviate any impact and/or contact of the rods 20. As shown in FIG. 2, the spring member 38 is located between the sub-channels 10a. For example, the spring 38 may be located between every other sub-channel 10a in the horizontal and vertical direction (as depicted in FIG. 1). However, it should be appreciated that other locations of the spring 38 may be positioned within the cell grid 15, such as, within each sub-channel or within every third sub-channel. The spring 38 may include an extension member 39 in a T-like shape (at both directions) for absorbing the abrading contact.

As depicted in FIG. 4, ferrule cells 25 on the side wall of one sub-channel 10a are shown. The ferrule cells 25 may act as a stop mechanism when fuel rods 20 are inserted within sub-channels 10a. Moreover, due to the shape of the ferrule cells 25 on the side wall of the sub-channels 10a, the ferrule cells 25 may also hold the spacing for the spring member 38.

Figure 3:
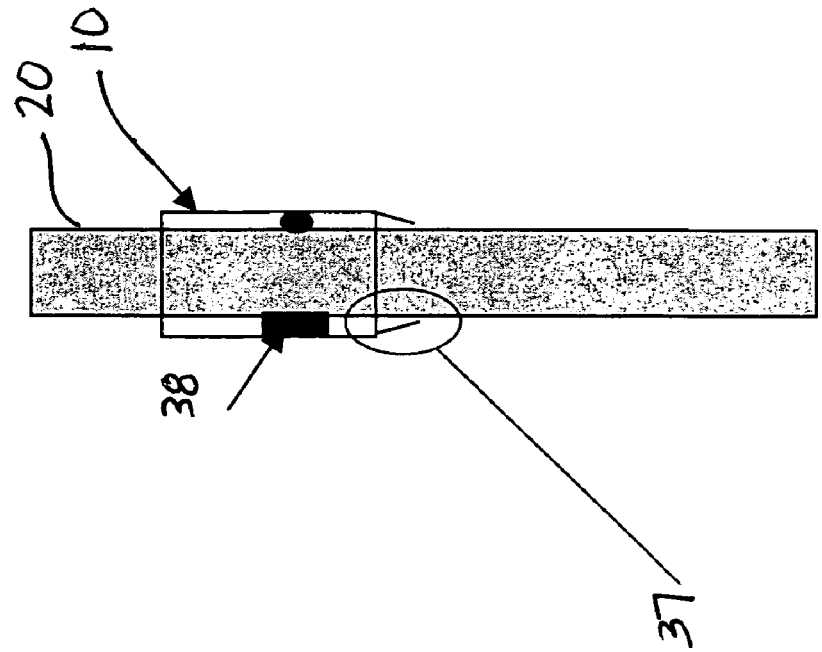
FIG. 3 is a side view of the fuel rod spacer assembly sub-components in accordance with an exemplary embodiment of the invention.

FIG. 3 is a side view of the fuel rod spacer assembly sub-components in accordance with an exemplary embodiment of the invention. As shown in FIG. 3, the fuel rod spacer assembly 10 includes a guide 37 for directing any debris to an open passage in the spacer body. Further, the guide 37 acts as an additional layer of protection of failure, in addition to the use of conventional filters, and thus decreasing the likelihood of failures from debris fretting just over and above the filter. As shown in FIG. 4, the guide 37 is located at a leading edge 41 of the fuel rod space assembly 10 and angled inward towards the fuel rod 20. In other words, as the flow of liquid moderator/coolant, such as water flows toward the fuel rod spacer assembly 10, the first leading edge that the liquid moderator/coolant contacts is the guide member 37. This affects any debris in the fuel assembly by directing the debris away from the fuel rods.

As shown in FIG. 4, the guide 37 may be in shape of a continuous, substantially circular, conical skirt. The conical skirt facilitates in having maximized open space in the middle of the flow channel while giving an area for the debris to pass through into the spacer body. In an exemplary embodiment, the angle of the conical skirt may be between 10-30 degrees. It should be appreciated that other angles may be used.

The guide 37 is also located interior to the fuel rod spacer assembly 10 such that horizontal surfaces are shielded from the coolant flow with angled members to divert debris away for such surfaces that are prone to collect debris. The guide 37 is also designed to orient the debris to present the minimum cross sectional area to increase the probability that the debris can completely pass through the fuel rod spacer assembly.

The guide 37 is also integral (one-piece) to the fuel rod spacer assembly 10 and acts to close off the inter-sub-channel paths that tend to collect debris. Further, the integral design of the guide 37 reduces the cost of manufacturing and reduces repair cost associated with numerous part fuel assemblies.

In an example embodiment, the present invention discloses a nuclear fuel rod spacer assembly 10 that incorporates a guide 37 to direct debris in the reactor coolant through open spaces in the fuel rod spacer assembly 10 and reduce the probability of debris being captured which may cause fuel rod failure due to fretting.

It should be appreciated that the fuel rod spacer assembly with the debris guide may be used simultaneously with an integrated debris trap which may be positioned anywhere along the core.

Although the fuel rod spacer assembly described herein may be the type used in a boiling water reactor, it should be appreciated that other types of reactors may be employed.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. In a fuel assembly for a nuclear reactor including a plurality of nuclear fuel rods, and at least one fuel rod spacer assembly supporting the fuel rods in an organized array, the fuel rod spacer assembly, comprising:
an opening in one sub-channel of the fuel rod spacer assembly;
a spring positioned within the opening;
at least one ferrule cell on a side wall of one sub-channel of the fuel rod spacer assembly; and
a guide forming a continuous, substantially circular, conical skirt that is angled inwardly and downwardly from a lower portion of the fuel rod spacer assembly towards the fuel rod to direct debris to open passages in the fuel rod spacer assembly, the guide configured to encircle at least one of the plurality of fuel rods while in use.

2. The fuel rod spacer assembly according to claim 1, wherein the guide is integral to the fuel spacer assembly to close off inter-sub-channel paths that tend to collect debris.

3. The fuel rod spacer assembly according to claim 1, wherein the guide is designed to have a cross-sectional area that is small enough to permit collected debris to pass through the fuel rod spacer assembly.

* * * * *